United States Patent [19]

Swan

[11] Patent Number: 5,864,369
[45] Date of Patent: Jan. 26, 1999

[54] METHOD AND APPARATUS FOR PROVIDING INTERLACED VIDEO ON A PROGRESSIVE DISPLAY

[75] Inventor: Philip Lawrence Swan, Toronto, Canada

[73] Assignee: ATI International SRL

[21] Appl. No.: 876,712

[22] Filed: Jun. 16, 1997

[51] Int. Cl.⁶ .................................................. H04N 7/01
[52] U.S. Cl. .......................................... 348/448; 348/441
[58] Field of Search ..................................... 348/448, 441, 348/581, 584, 452, 805, 806, 625, 553, 554

[56] References Cited

U.S. PATENT DOCUMENTS

| | | | |
|---|---|---|---|
| 5,014,119 | 5/1991 | Faroudja | 348/448 |
| 5,151,783 | 9/1992 | Faroudja | 348/448 |
| 5,208,669 | 5/1993 | Richards | 348/448 |

Primary Examiner—Victor R. Kostak
Attorney, Agent, or Firm—Markison & Reckamp

[57] ABSTRACT

A method and apparatus for providing interlaced video data on a progressive display is accomplished upon receiving interlaced image data that is temporally and spatially accurate and calculating, based on a first predetermined function, calculated image data. Next, the calculated image data is compared to a threshold. When the calculated image data exceeds the threshold, the received interlaced image data is adjusted to approximate the threshold. When the calculated image data does not exceed the threshold, the received interlaced image data is adjusted to equal the calculated interlaced data. Having done this, additional information is created and subsequently combined with the adjusted interlaced image data to produce a complete field for display on the progressive display. The additional image information is of a first value when the calculated image data does not exceed the threshold and is as functional value when the calculated image data exceeds the threshold.

21 Claims, 7 Drawing Sheets

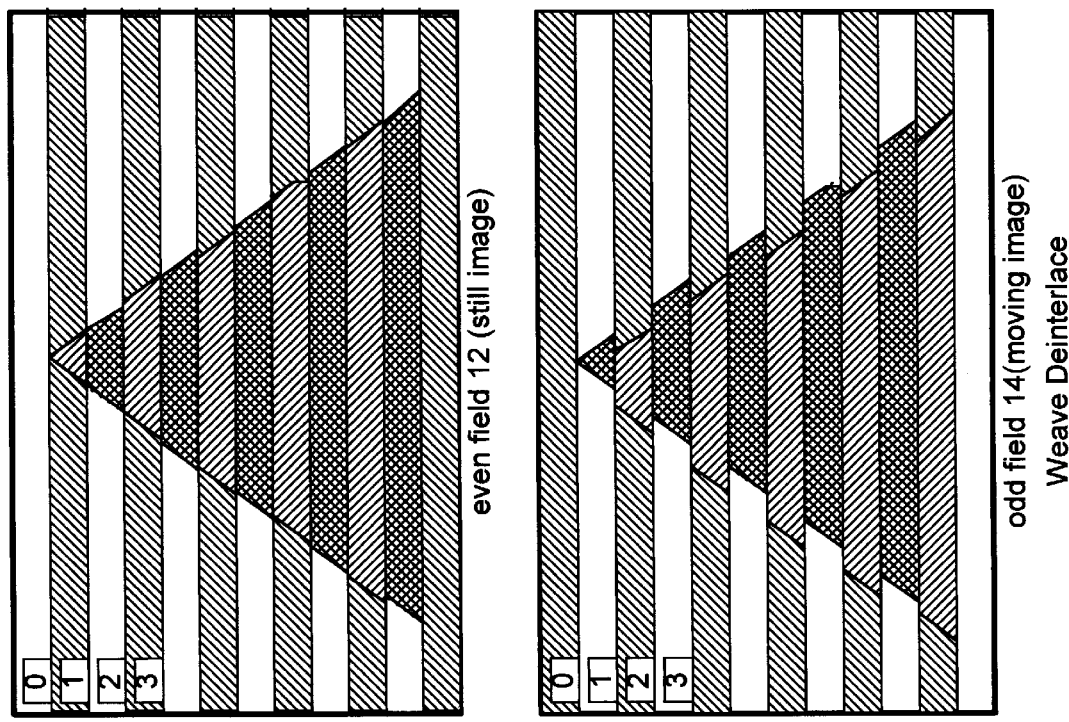
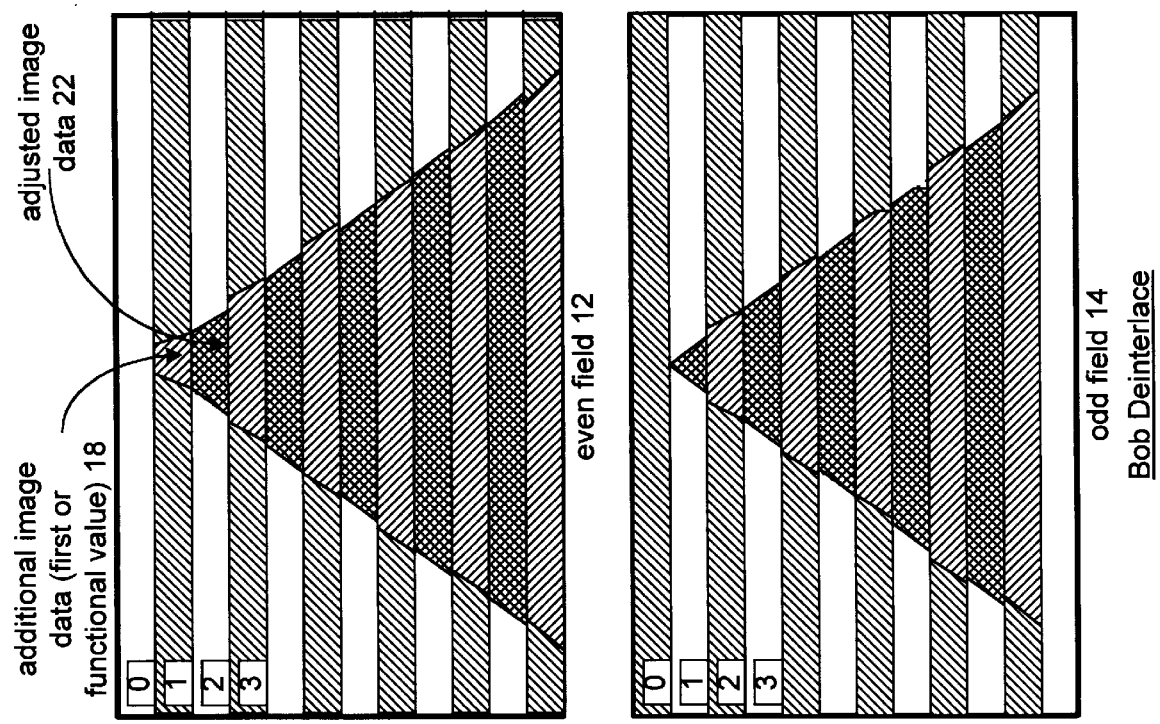
Figure 2

5,864,369

METHOD AND APPARATUS FOR PROVIDING INTERLACED VIDEO ON A PROGRESSIVE DISPLAY

TECHNICAL FIELD OF THE INVENTION

This invention relates generally to computer displays and more particularly to a method and apparatus for providing interlaced video data on a progressive display.

BACKGROUND OF THE INVENTION

Computer displays and televisions are known to utilize different display techniques; computer displays utilize a progressive display technique, while televisions utilize an interlaced technique. The progressive display technique creates fields for displaying wherein each field includes complete pixel information for the display. For example, if the computer display is a 640×480 pixel display, each line of a field would include the appropriate pixel information for display. Thus, each field displayed, which is done at a refresh rate of the computer display (e.g., 60 hertz, 75 hertz, 90 hertz, etc.), is complete. Because each field contains complete pixel information, no human perception filtering is required.

The interlaced technique has two types of fields; even fields and odd fields. An even field contains only the pixel information for even lines, while the odd field includes only pixel information for odd lines. As such, both fields are incomplete. When displayed at the refresh rate of the television, which may be approximately 60 hertz in North America, the fields are presented at a rate of 30 even fields and 30 odd fields per second. Because the interlaced display technique alternates between even fields and odd fields, the human visual process filters the fields such that complete images are perceived by the viewer.

As one would expect, a video source designed for display on a television is not directly presentable on a computer display. Such video sources include video cassette records, broadcast television, cable television, satellite television, etc. To present interlaced video data on a progressive computer display, the missing lines must be filled in for each field.

One such technique for filling in the missing lines is referred to as "bob." The bob technique fills in the missing lines of a particular field by calculating the missing data from the image data of the lines that are present on a given field. This technique works well for moving images but, for still images, creates fuzzy edges of the images, which degrades the video quality.

Another technique for completing the missing lines is referred to as a "weave" technique. The weave technique utilizes multiple fields to create the missing lines. This technique works well for still images but, for moving images, creates jagged edges.

Yet another technique is to fill the missing lines in with black image data. (For pixel information the black image data would be all zeros.) By filling in the missing lines with black data, the progressive display resembles television, in that, each field (odd or even) contains less than all of the image data. When presented on the progressive display, at a 60 hertz rate, the human eye filters the even and odd fields such that it perceives a single object. This technique, however, reduces the resulting intensity of the display by a factor of two compared to the bob or weave technique. Thus, images presented on a progressive display are less intense than intended, thereby reducing the video quality.

Therefore, a need exists for a method and apparatus that allows interlaced video data to be presented on a progressive display with minimal adverse visual effects.

BRIEF DESCRIPTION OF THE DRAWINGS

FIG. 2 illustrates a plurality of fields which are in accordance with the present invention;

DETAILED DESCRIPTION OF THE DRAWINGS

Generally, the present invention provides a method and apparatus for converting interlaced video data into progressive display data. This may be accomplished upon receiving interlaced image data that is temporally and spatially accurate. The received interlaced image data contains less image information than is required for displaying on a progressive display. Upon receiving the interlaced image data, a calculation is made, based on a first predetermined function, to obtain calculated image data. Next, the calculated image data is compared to a threshold. When the calculated image data exceeds the threshold, the received interlaced image data is adjusted to approximate the threshold. When the calculated image data does not exceed the threshold, the received interlaced image data is adjusted to equal the calculated interlaced data. Having done this, additional information is created and subsequently combined with the adjusted interlaced image data to produce a complete field for display on the progressive display. For example, if the received interlaced image data is an even field, the additional information is used to complete, or fill in, the missing odd lines. The additional image information is a first value when the calculated image data does not exceed the threshold and is a functional value when the calculated image data exceeds the threshold.

The calculated image data may be determined by doubling the intensity of the interlaced image data provided the doubling does not exceed the maximum intensity level (i.e., the threshold). If, for each line of the interlaced image data that does not exceed the maximum intensity level, the adjacent fill-in lines (i.e., the odd lines on an even field), will contain black image data (i.e., all zeros for pixel information). If, however, the doubling of the intensity of the interlaced image data would exceed the maximum intensity level, the intensity level for the particular interlaced image data is set to approximately the maximum intensity level, which leave a remainder. The remainder, or overshoot amount, of the intensity is used to calculate the functional value which fills in the missing lines, such that the fill-in lines have an intensity value greater than the black image data. In other words, the fill-in lines are filled in with a gray scale as opposed to black lines. With such a method and apparatus, interlaced video data may be presented on a progressive display with substantially less adverse visual effects than produced by the bob and weave techniques and without degradation to the intensity levels of prior deinterlaced techniques. In addition, by adjusting the intensity level of the images being presented, the video quality is comparable to the video quality of televisions.

Figure 1:
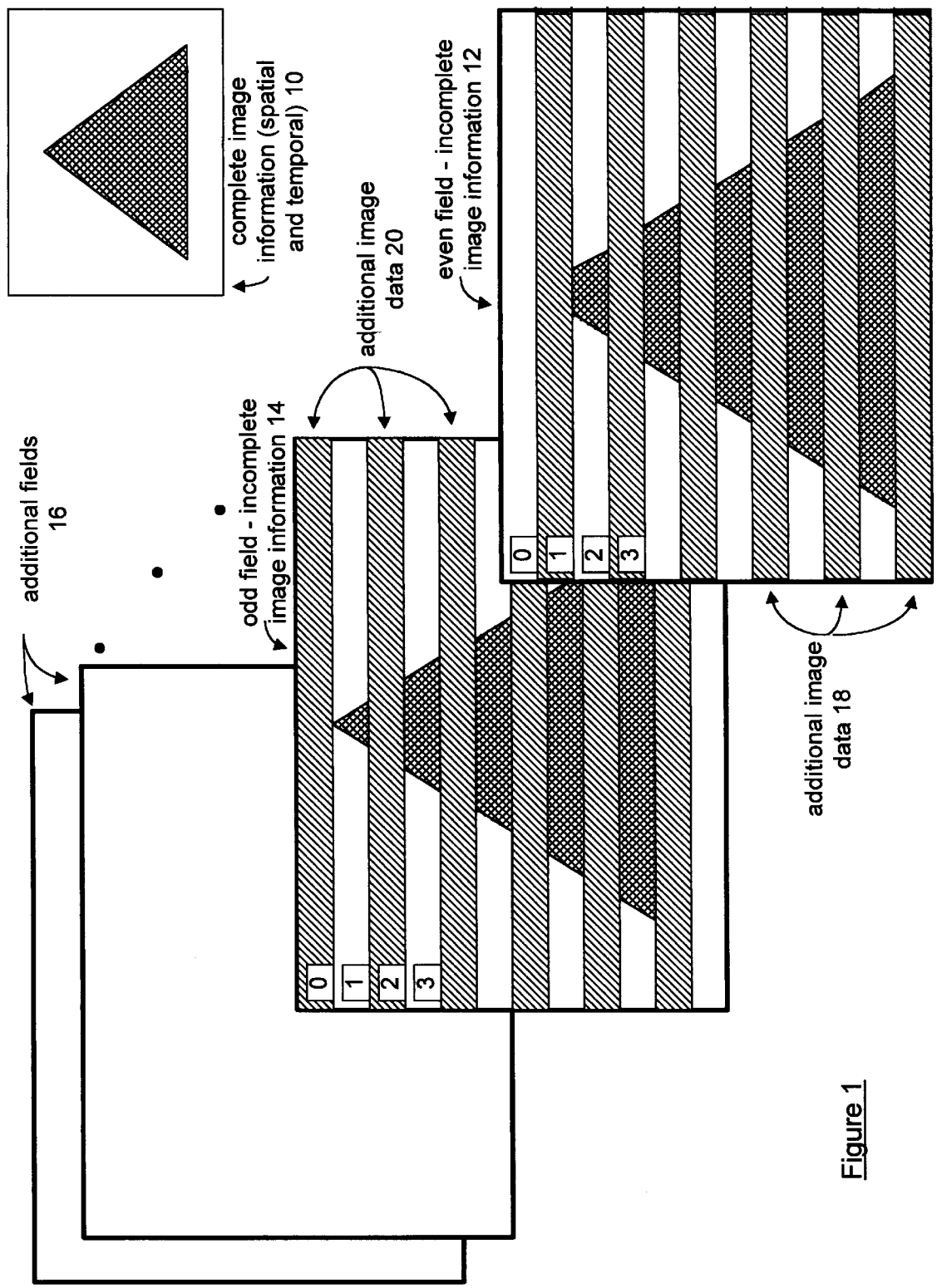
FIG. 1 illustrates a graphical representation of a plurality of interlaced fields in accordance with the present invention.

The present invention can be more fully described with reference to FIGS. 1 through 7. FIG. 1 illustrates a plurality of fields 12, 14, 16 that contain interlaced video data. The image to be displayed, or the complete image information 10, includes spatially and temporally accurate information. As shown, the complete image to be displayed is a triangle. The triangle may be a still image or a moving image over a sequence of fields. Note that the images being presented may be done in the digital domain wherein each field contains pixel information, or may be done in the analog domain wherein each field includes signal levels.

The even field 12, contains incomplete image information, i.e., less than complete spatial and temporal information of the complete image 10, but includes temporally and spatially accurate information for each even line of the complete image 10. For this example, the even lines are 0, 2, 4, etc. The odd lines 1, 3, 5, etc. include additional image data 18. The image data of the even lines have been adjusted based on a first predetermined function. The first predetermined function may be a doubling of the perceived video aspects of the image 10, wherein the perceived video aspects include a brightness function, a hue function, and a color saturation function which indicates the richness or vibrancy of the images being presented. Alternatively, the predetermined function may be a linear function or exponential function of the perceived video aspects. If the adjustment to an even line would exceed a threshold, the image data of the even line would be adjusted to approximate the threshold. Such an approximation may be setting the adjusted image data to equal the threshold, or equal to a threshold function that asymptotes to a particular maximum value. Adjusting the temporally and spatially accurate information will be discussed in greater detail with reference to FIGS. 3–7.

For each of the odd lines in the even field 12, the additional image data 18 is calculated based on the even lines in a proximal relationship to the odd line. For example, the additional information for line 3 may be calculated based on the adjusted image data of lines 2 and 4, or of lines 0, 2, 4 and 6. As one skilled in the art will readily appreciate, the calculation of the additional image data may be done in a variety of ways, for example, averaging the immediately preceding and succeeding lines, using alternate mathematical algorithm to calculate the additional image data, etc. If the adjusted image data of the proximal even lines are less than the threshold, the additional image data of the odd line would be a first value. The first value may be any intensity value desired by the designer. For example, the first value may be black. If, however, the adjusted image data of proximal even lines are set to approximate the threshold, the additional image data of the odd line would be a functional value based on the remainder, or overshoot, image data.

The odd field 14 includes incomplete image information of the complete image 10. In the odd field 14, the odd number lines include the adjusted image data of the spatially and temporally accurate information, while the even lines contain the additional image information 20. The adjusting of the image data of the odd lines and the calculation of the additional image data 20 is as discussed above with reference to the even field 12.

FIG. 2 illustrates the calculation of the additional image data based on the bob deinterlacing technique and the weave deinterlacing technique. In the upper-left portion of the figure, an even field 12 is shown to include the additional image data 18 which may be a first value or a functional value. The adjusted image data 22 includes the portion of the triangle represented in the particular even lines, and also the surrounding images, in this example white space. As such, each even line, regardless of whether it was representing the white space or the triangle, would have a calculation done, based on the first predetermined function, to adjust the parameters of the particular data contained therein. If such a calculation would exceed the threshold, the adjusted image data 22 is set to approximate the threshold. Such approximation may be setting the adjusted image data to a maximum image data parameter, where the image data parameter includes the brightness function, hue function, and color saturation function of perceived video aspects of the image.

Once the calculation has been made to create the adjusted image data 22, a determination is made as to whether it exceeds the given threshold. If it does, the adjusted image data 22 is set to approximate the threshold, wherein the overshoot image data, or remainder, is used to calculated the functional value of the additional image data 18. In other words, the additional brightness required to double an even line, is added into the additional image data 18. Thus, if the first value is black, the functional value is a gray scale which is based on the overshoot image data. Utilizing the same approach, the remaining even lines are adjusted and the additional information is calculated. Note that the adjusting of the image data may further include adjusting the gamma factor, which will be discussed below with reference to FIG. 3.

The odd field 14 has a similar calculation done but for the additional information to fill-in the even lines. Note that by comparing the odd field 14 and even field 12 created by the bob deinterlace technique, the size of the triangles may be different. When displayed at a 60 hertz rate, the perceived video aspects will be filtered by the human eye such that a single triangle of an average size will be perceived.

The upper-right portion of FIG. 2 illustrates a weave deinterlaced technique for calculating the additional image data 18 for a still image. The adjusting of the image data of the even lines is as discussed above. The calculation for the additional image information is based on adjusted image data of corresponding lines in other fields. If the adjusted image data of the corresponding lines in the other fields do not exceed the threshold, the additional image information is of the first value, which may be black. If, however, the adjusted image data of the corresponding lines in the other fields exceeds the threshold, the additional image information will be a functional value, which may be black offset by the overshoot image data, or remainder image data. Note that in this figure, for a still picture, the resulting triangle is a very clear image of the triangle 10 being presented.

The lower-right portion of FIG. 2 illustrates an odd field 14 which is presenting a moving image. The additional image information of the missing lines 0, 2, 4, etc. are calculated as discussed above. As such, the offsets, or jagged edges, are less prevalent when the adjusted image data does not exceed the threshold and becomes more prevalent as the image data exceeds the threshold. As one skilled in the art will readily appreciate, when the weave deinterlaced technique is used to determine the additional information for still images, the images will have better definition than the bob deinterlaced technique. When the bob deinterlaced technique is used to determine the additional information for moving images, the images will have better definition than the weave deinterlaced technique.

Figure 3:
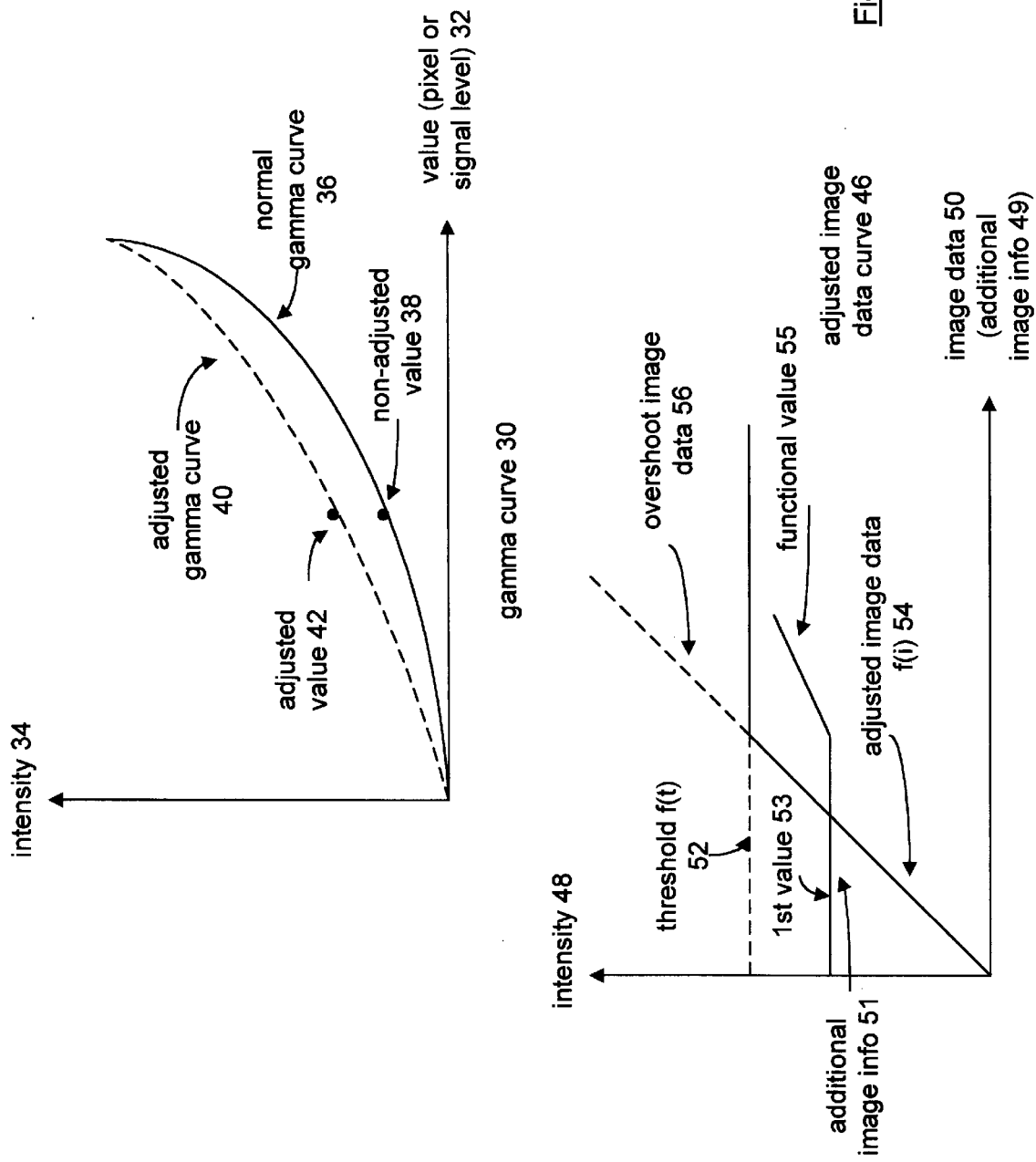
FIG. 3 illustrates graphical representations of adjusted image data in accordance with the present invention.

FIG. 3 illustrates a graphical representation of a gamma curve 30. The horizontal axis of gamma curve 30 is for a particular value 32, which may be pixel information (when in the digital domain), or signal levels (when in the analog domain). The vertical axis represents intensity. For example, if pixel information is being represented, maximum intensity is obtained at the maximum pixel value. As such, if pixel information is represented by 8 bits, the minimum intensity would be zero, while maximum intensity would be 255.

The gamma curve 30 shows a normal gamma curve 36 which is based on the mathematical function of: intensity= $[(value)/255]^{gamma\ factor}$, where the gamma factor is typically in the range of 2.2 to 2.8, but may be any value greater than 0. On the normal gamma curve (gamma factor=2.2), a point for a non-adjusted value 38 is indicated. This non-adjusted value 38 indicates one pixel of a line that contains accurate temporal and spatial image data. For example, if the particular field is an even field, the non-adjusted value 38 would be a pixel point of an even line.

The gamma curve 30 also includes an adjusted gamma curve 40 (a gamma factor of 2.8) and an adjusted value 42. By adjusting the gamma curve 40, the adjusted value may be increased based on the gamma curve and by changing the intensity. But, by changing the gamma factor, the intensity does not have to be double, thereby reducing the chance of exceeding the threshold. As previously mentioned, when the adjusted image data does not exceed the threshold, the video image quality is enhanced. Thus, adjusting the gamma factor in addition to adjusting the intensity improves the video quality. Note that the intensity 34 includes the brightness function, hue function, and/or color saturation function.

FIG. 3 also illustrates a graph of image data 50 and additional image data 49 vs. intensity 48. As shown, the adjusted image data 54 is based on some function f(i). The function f(i) may be a linear function where the adjusted image data is simply a doubling of the image data up to a particular threshold function 52 and then set to a constant value equaling the threshold 52. Alternatively, the function f(i) may be based on an adjustment to the gamma factor and the intensity. Still further, the function f(i) converges to an asymptote of the threshold 52 as it is adjusted. The overshoot image data 56 would be calculated based on the difference between the function f(i) and the threshold function 52. Note that the threshold function 52 may be a constant, a linear function, or non-linear function depending on the desired visual affects.

The graph further illustrates the additional information 51 which is shown to include two parts: the first value portion 53 and the functional value portion 55. The first value 53 is shown to be a constant value which may be black image data. The functional value 55 is shown to be a linear value, but may be non-linear depending on the function f(i) and the threshold function 52. The determination of the functional value 55 may be done by interpolation of the adjusted image data 54 and/or the overshoot image data 56. Such interpolation may be done by interpolating image information that is temporally accurate and spatially proximate (bob), or spatially accurate and temporally proximate (weave). Alternatively, the functional value may be based on human visual perception and the gamma curve to produce negligible adverse visual effects. As yet another alternative, the functional value may be determined based on spatially modulating the image information using at least one dimensional interleaving, or temporally modulating the information using at least one dimensional interleaving and/or dithering the image data.

Figure 4:
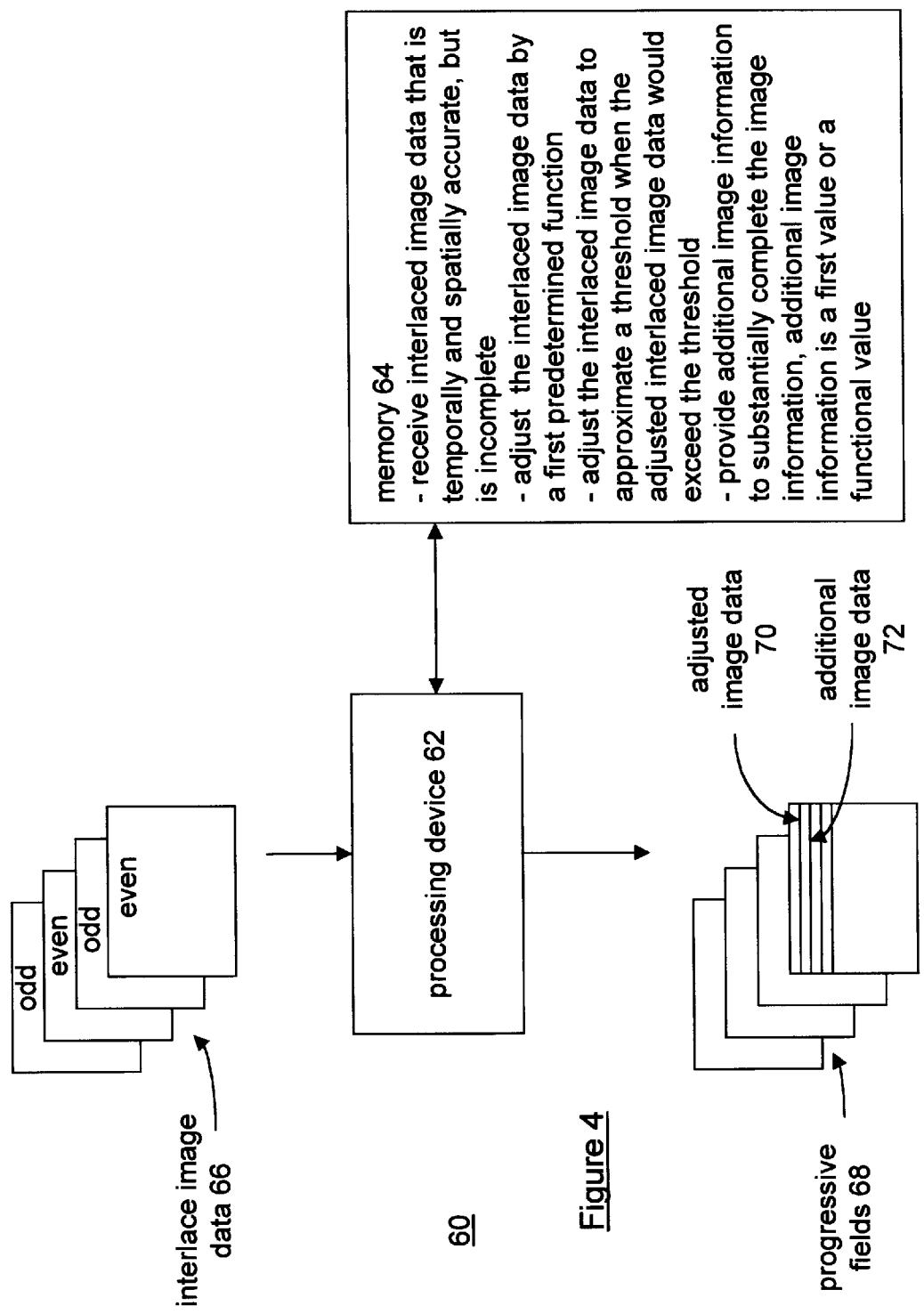
FIG. 4 illustrates a schematic block diagram of an interlaced video data conversion circuit which is in accordance with the present invention.

FIG. 4 illustrates a schematic block diagram of a deinterlaced video data conversion circuit 60. The circuit 60 is shown to include a processing device 62 and memory 64. The processing device 62 may be a microprocessor, central processing unit, digital signal processor, micro-controller or any other device that manipulates digital information based on programming instructions. The memory 64 may be random access memory ("RAM"), read-only memory ("ROM"), electronically erasable read-only memory, or any other type of digital storage means.

In operation, the processing device 62 evokes the programming instructions stored in memory 64. Upon evoking the programming instructions, the processing device 62 receives interlaced image data 66 that is temporally and spatially accurate but is incomplete on a per field basis. As previously mentioned interlaced image data includes a plurality of even fields and odd fields wherein the even fields include image data for the even lines while the odd fields include image data for the odd lines. Upon receiving the interlaced image data 66, the processing device 62 then adjusts the interlaced image data by a first predetermined function. Such an adjustment is first done by calculating image data based on the first predetermined function. If such a calculation exceeds a threshold, the interlaced image data is adjusted to approximate the threshold, otherwise, the interlaced image data is adjusted to equal the calculated value.

Having done this, the processing device 62 then provides additional information to substantially complete the image information of each field of the interlaced image data. Such additional information, or image data, is based on the results of adjusting the interlaced image data. If the calculated interlaced image data exceeds the threshold, the additional information is a functional value (which was previously discussed with reference to FIG. 3). The additional information is a first value when the threshold was not exceeded by the calculated value. Having created the additional image data, or information, the processing device 62 produces a plurality of progressive fields 68 which includes the adjusted image data 70 and the additional image data 72 for subsequent display on a computer display utilizing the progressive display technique.

Figure 5:
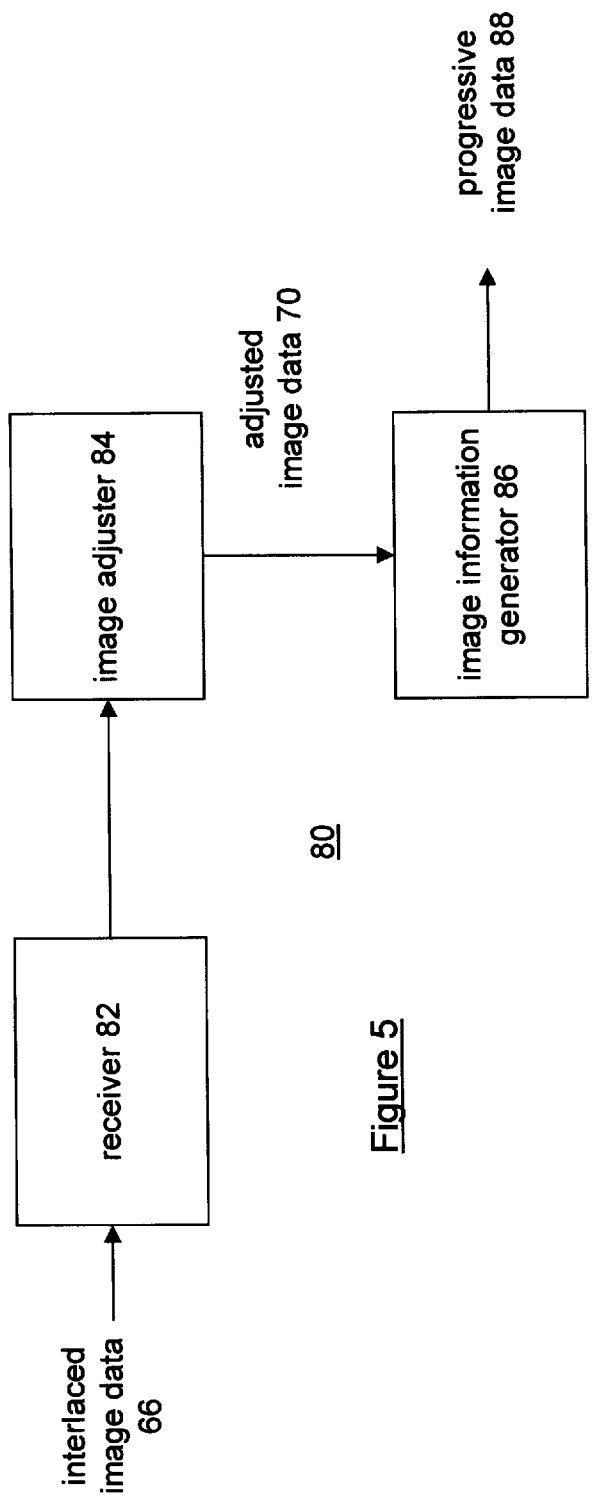
FIG. 5 illustrates a schematic block diagram of an alternate interlaced video conversion circuit which is accordance with the present invention.

FIG. 5 illustrates a circuit 80 that converts interlaced data 66 into progressive image data 88. As shown, the circuit 80 includes a receiver 82, an image adjuster 84, and an image information generator 86. The receiver 82, which may be a video graphics circuit, receives the interlaced image data 66 and subsequently provides it to the image adjuster 84. The image adjuster 84, which may be incorporated in the video graphics circuit, adjusts the interlaced image data based on a first predetermined function. The first predetermined function may be doubling the intensity of the interlaced image data, or modifying the gamma factor and scaling the intensity. If such adjusting would exceed the maximum allowable intensity for the image data, the image data is set to the maximum intensity where the remainder, or overshoot, image data is provided to the image information generator 86, which may also be part of the video graphics circuit.

The image information generator 86 receives the adjusted image data 70 and the overshoot image data, if any. From this information, the image information generator 86 generates additional image data based on the adjusted image data and the overshoot image data. Such additional image data may be of a first value or a functional value. Having created this information, the image information generator 86 outputs progressive information image data 88 which is a combination of the adjusted image data 70 and the additional image data.

Figure 6:
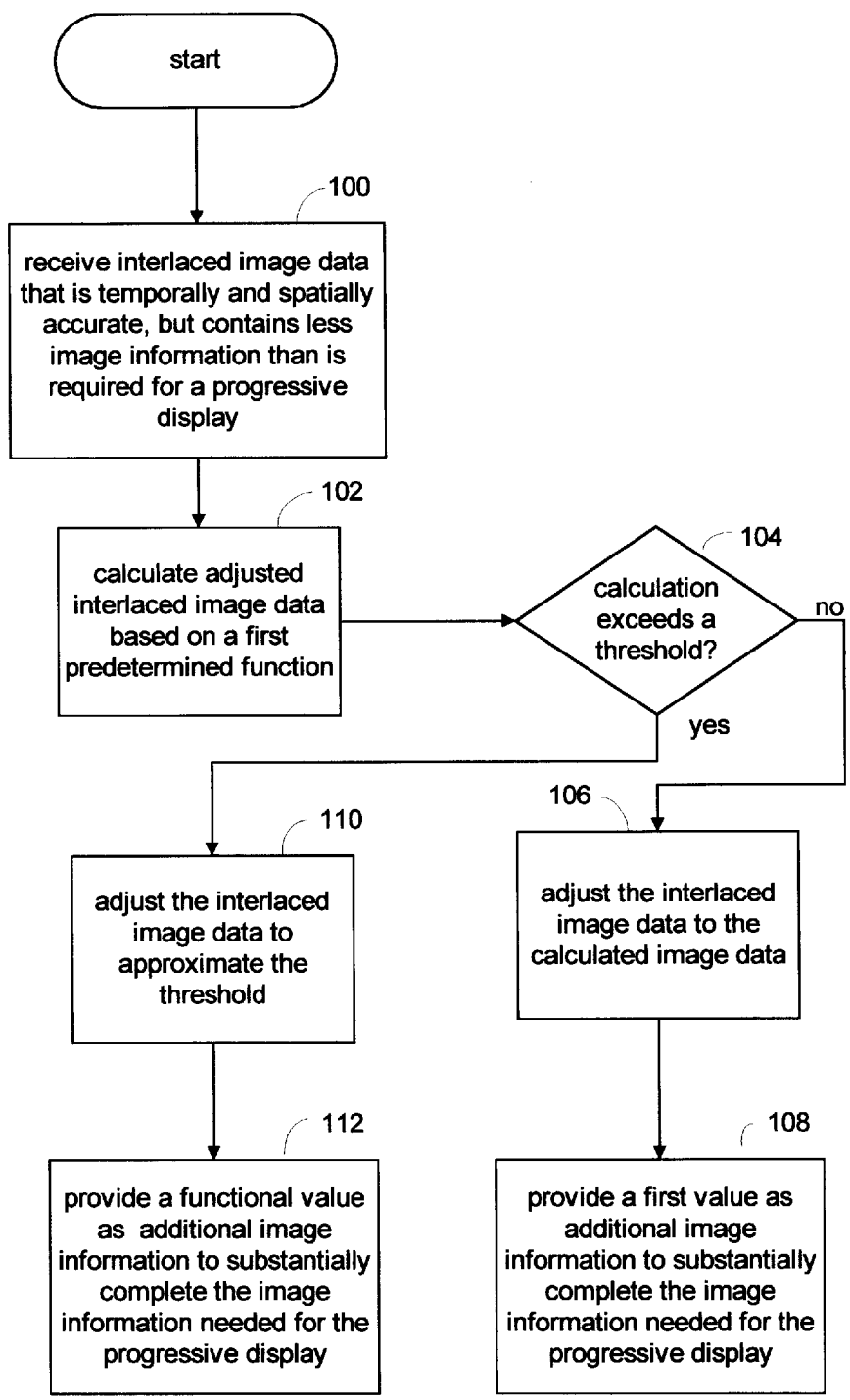
FIG. 6 illustrates a logic diagram which may be used to implement a conversion from interlaced video data to progressive display information in accordance with the present invention.

FIG. 6 illustrates a logic diagram that may be used to provide interlaced video data on a progressive display. The process begins at step 100 where interlaced image data is received. Such interlaced image data is temporally and spatially accurate but contains less image information that is required for a progressive display. Such interlaced image data may be received as even fields and odd fields. The process then proceeds to step 102 where a calculation is made to determine calculated image data. Such a calculation is based on a first predetermined function. Note that the first predetermined function may be doubling the perceived video aspects of at least a portion of the image data of at least one of the even fields and/or the odd fields, modification of the gamma factor, etc. Further note that the perceived video aspects may include the brightness function, hue function, and color saturation function.

The process then proceeds to step 104 where a determination is made as to whether the calculation exceeds a threshold. If not, the process proceeds to step 106 where the interlaced image data is adjusted to equal the calculated image data. Having done this, the process then proceeds to step 108 where additional information is provided as a first value wherein the additional image data, or information, substantially completes the image information needed for the progressive display.

If, however, the calculation exceeds the threshold, the process proceeds to step 110. At step 110, the interlaced image data is adjusted to approximate the threshold. Such approximation may be done by adjusting the interlaced image data to substantially equal the threshold or based on a function that asymptotes to the threshold. Having adjusted the interlaced image data, the process proceeds to step 112 where a functional value is provided as the additional information. Such additional information substantially completes the image information needed for the progressive display.

The functional value may be determined by interpolation of the image data that is proximal to the additional image data on the display and a scaling factor that represents overshoot image data, wherein the overshoot image data is approximately equal to the adjusted image data less the threshold (refer to FIG. 3 for a graphical representation). Such interpolation may be done by interpolating the image data that is temporally accurate and spatially proximate (i.e., bob) or may be done by interpreting the image data that is spatially accurate and temporally proximate (i.e., weave). Further, the functional value may be based on human perceived visual perception and a gamma curve which is shown in FIG. 3. Such human visual perceptions require the eye to filter the even and odd fields. As long as the even and odd fields are presented at a rate that exceeds the human perception rate, such filtering will be accurate. Still further, the first functional value may be determined by spatially modulating the image data using at least one dimensional interleaving, temporally modulating the image data using at least one dimensional interleaving, and/or dithering the image data.

Figure 7:
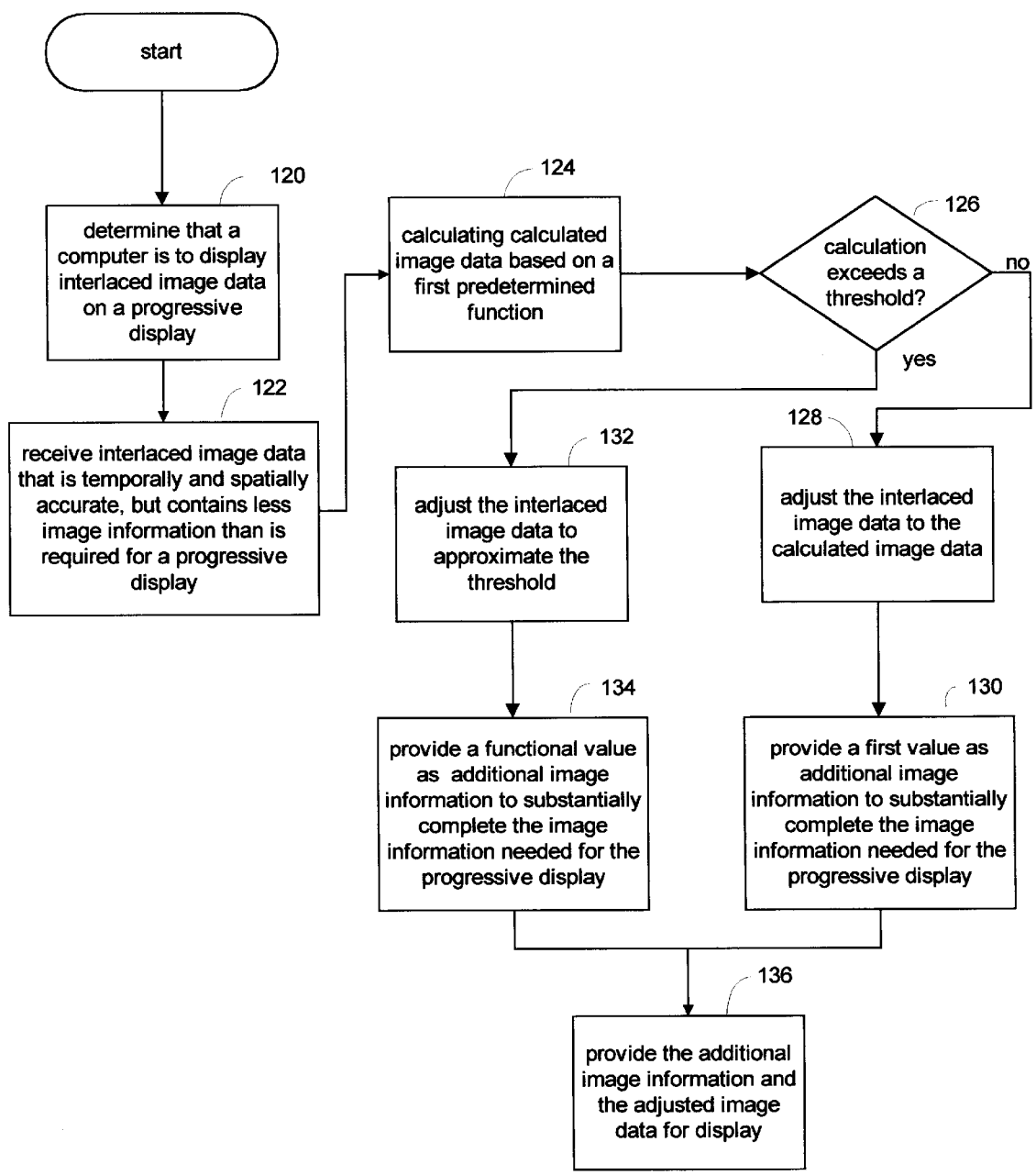
FIG. 7 illustrates a logic diagram which may be used to implement an alternate method for converting interlaced video data to progressive display data in accordance with the present invention.

FIG. 7 illustrates a logic diagram that may be used to obtain an operating system that processes interlaced video data on a progressive display. The processing steps of FIG. 7 may be stored as programming instructions on a digital storage medium such as a computer disk, read-only memory, magnetic tape, random access memory, or any other means for storing digital information, which would be subsequently executed by a central processing unit of a computer.

The process begins at step 120 where a determination is made that a computer is to display interlaced image data on a progressive display. At this point, the process proceeds to step 122 where the interlaced image data, which is temporally and spatially accurate, is received. Such interlaced image data contains less image information than is required for a progressive display. At this point, the process proceeds to step 124 where calculated image data is determined based on a first predetermined function. The process then proceeds to step 126 where a determination is made as to whether the calculated image data exceeds the threshold.

If not, the process proceeds to step 128 where the interlaced image data is adjusted to the calculated image data. The process then proceeds to step 130 where a first value is provided as additional image information. The additional image information, along with the adjusted interlaced image data, substantially completes the image information needed for the progressive display. Next, the process proceeds to step 136 where the additional image information and the adjusted image data are provided for subsequent display.

If, however, the calculated image data exceeds the threshold, the process proceeds to step 132. At step 132, the interlaced image data is adjusted to approximate the threshold. Having made this adjustment, the process proceeds to step 134 where a functional value is provided as additional image information. Such additional image information substantially completes the image information needed for the progressive display. Having created the additional image information, the process proceeds to step 136 where the additional image information and the adjusted image data are provided for subsequent display.

The preceding discussion has provided a method and apparatus for providing interlaced video data on a progressive display. Such a method and apparatus substantially eliminates the jagged and/or fuzzy edge issues of bob and weave deinterlacing techniques while also substantially eliminating the reduction in intensity of the constant value fill-in technique. By utilizing the present invention, a computer display can achieve video quality that equates to the video quality of television.

What is claimed is:

1. A method for providing interlace video on a progressive display, the method comprising the steps of:
  a) receiving interlaced image data that is temporally and spatially accurate, wherein the interlace image data contains less image information than required for the progressive display;
  b) calculating adjusted interlaced image data based on a first predetermined function to produce calculated image data;
  c) when the calculated image data exceeds a threshold, adjusting the interlaced image data to approximate the threshold to obtain adjusted image data; and
  d) providing additional image information to substantially complete the image information, wherein the additional image information is of a first value when the calculated image data did not exceed the threshold and is a functional value when the calculated image data exceeds the threshold.

2. The method of claim 1 further comprises, within step (a), receiving the interlaced image data as an even field and an odd field.

3. The method of claim 2 further comprises, within step (b), doubling perceived video aspects of at least a portion of the interlaced image data of at least one of the even field and the odd field as the first predetermined function.

4. The method of claim 3 further comprises doubling at least one of brightness function, hue function, and color saturation function as the perceived video aspects.

5. The method of claim 1 further comprises, within step (c), adjusting the interlaced image data based on a function that asymptotes to the threshold.

6. The method of claim 1 further comprises, within step (c), adjusting the image information to substantially equal the threshold.

7. The method of claim 1 further comprises, within step (d), providing black image information as the first value.

8. The method of claim 1 further comprises, within step (d), determining the functional value based on interpolation of the adjusted image data that is proximal to the additional image information on the display and a scaling factor that represents overshoot image data, wherein the overshoot image data is approximately equal to a function based on the adjusted image data and the threshold.

9. The method of claim 8 further comprises interpolating the functional value by least one of: interpolating adjusted image data that is temporally accurate and spatially proximate, and interpolating spatially accurate and temporally proximate adjusted image data.

10. The method of claim 8 further comprises scaling the functional value based on human visual perception and a gamma curve of the progressive display with negligible adverse visual affects.

11. The method of claim 8 further comprises interpolating the functional value by least one of: spatially modulating the adjusted image data using at least one dimensional interleaving, temporally modulating the adjusted image data using at least one dimensional interleaving, and dithering of the adjusted image data.

12. A circuit for providing interlace video on a progressive display, the circuit comprising:
   processing device; and
   memory that stores programming instructions that, when read by the processing circuit, causes the processing circuit to (a) receive interlaced image data that is temporally and spatially accurate, wherein the interlace image data contains less image information than required for the progressive display; (b) calculate, based on a first predetermined function, calculated image data; (c) adjust the interlaced image data to approximate a threshold when the calculated image data exceeds the threshold; and (d) provide additional image information to substantially complete the image information, wherein the additional image information is of a first value when the calculated image data does not exceed the threshold and is functional value when the calculated image data exceeds the threshold.

13. A circuit for providing interlace video on a progressive display, the circuit comprising:
   a receiver that receives interlaced image data that is temporally and spatially accurate, wherein the interlace image data contains less image information than required for the progressive display;
   image adjuster that adjusts the interlaced image data by a first predetermined function, wherein the image adjuster adjusts the interlaced image data to approximate a threshold when the adjusting of the interlaced image data would have exceeded the threshold; and
   image information generator operably coupled to the image adjuster, wherein the image information generator generates additional image information to substantially complete the interlaced image data, wherein the additional image information is of a first value when the adjusting the interlaced image data did not exceed the threshold and is functional value when the adjusting the interlaced image data would have exceed the threshold.

14. A digital storage medium that stores programming instructions that, when read by a processing device, causes the processing device to providing interlace video on a progressive display, the digital storage medium comprising:
   first storage means for storing programming instructions that, when read by the processing device, causes the processing device to receive interlaced image data that is temporally and spatially accurate, wherein the interlace image data contains less image information than required for the progressive display;
   second storage means for storing programming instructions that, when read by the processing device, causes the processing device to calculate, based on a first predetermined function, calculated image data;
   third storage means for storing programming instructions that, when read by the processing device, causes the processing device to adjust the interlaced image data to approximate a threshold when the calculated image data exceeds the threshold to produce adjusted image data; and
   fourth storage means for storing programming instructions that, when read by the processing device, causes the processing device to provide additional image information to substantially complete the interlaced image data, wherein the additional image information is of a first value when the calculated image data did not exceed the threshold and is functional value when the calculated image data exceeds the threshold.

15. The digital storage medium of claim 14 further comprises programming instructions, within the first storage means that causes the processing device to receive the interlaced image data as an even field and an odd field.

16. The digital storage medium of claim 15 further comprises programming instructions, within the second storage means that causes the processing device to double perceived video aspects of at least a portion of the interlaced image data of at least one of the even field and the odd field as the first predetermined function.

17. The digital storage medium of claim 14 further comprises programming instructions, within the fourth storage means that causes the processing device to provide black image information as the first value.

18. The digital storage medium of claim 14 further comprises programming instructions, within the fourth storage means that causes the processing device to determine the functional value based on interpolation of the adjusted image data that is proximal to the additional image information on the display and a scaling factor that represents overshoot image data, wherein the overshoot image data is a function of the adjusted image data and the threshold.

19. A method for providing operating system functions, the method comprising the steps of:
   a) determining whether a computer is to display a video image on a progressive display;
   b) obtaining interlaced image data that is temporally and spatially accurate, wherein the interlace image data contains less image information than required for the progressive display;
   c) calculating, based on a first predetermined function, calculated image data;

d) when the calculated image data exceeds a threshold, adjusting the interlaced image data to approximate the threshold to produce adjusted image data;

e) providing additional image information to substantially complete the image information, wherein the additional image information is of a first value when the calculated image data did not exceed the threshold and is a functional value when the calculated image data exceeds the threshold; and f) causing the additional image information and the adjusted image data to be displayed on the progressive display.

20. A digital storage medium that stores programming instructions that, when read by a processing device, causes the processing device to provide operating system functions, the digital storage medium comprising:

first storage means for storing programming instructions that, when read by the processing device, causes the processing device to determine a computer is to display a video image on a progressive display;

second storage means for storing programming instructions that, when read by the processing device, causes the processing device to obtain interlaced image data that is temporally and spatially accurate, wherein the interlace image data contains less image information than required for the progressive display;

third storage means for storing programming instructions that, when read by the processing device, causes the processing device to calculate, based on a first predetermined function, calculated image data;

fourth storage means for storing programming instructions that, when read by the processing device, causes the processing device to adjust the interlaced image data to approximate the threshold when the calculated image data exceeds the threshold to produce adjusted image data;

fifth storage means for storing programming instructions that, when read by the processing device, causes the processing device to provide additional image information to substantially complete the image information, wherein the additional image information is of a first value when the calculated data does not exceed the threshold and is a functional value when the calculated image data exceeds the threshold; and sixth storage means for storing programming instructions that, when read by the processing device, causes the processing device to cause the additional image information and the adjusted image data to be displayed on the progressive display.

21. A method for providing interlace video on a progressive display, the method comprising the steps of:

a) receiving interlaced image data that is temporally and spatially accurate, wherein the interlace image data contains less image information than required for the progressive display;

b) calculating adjusted interlaced image data based on a first predetermined function to produce calculated image data;

c) when the calculated image data does not exceed a threshold, adjusting the interlaced image data to approximate the calculated image data to obtain adjusted image data; and d) providing additional image information to substantially complete the image information, wherein the additional image information is of a first value when the calculated image data did not exceed the threshold and is a functional value when the calculated image data exceeds the threshold.

* * * * *